United States Patent [19]
Miyanari

[11] Patent Number: 5,625,268
[45] Date of Patent: Apr. 29, 1997

[54] STEPPING MOTOR DRIVE UNIT

[75] Inventor: Hiroshi Miyanari, Tokyo, Japan

[73] Assignee: Canon Kabushiki Kaisha, Tokyo, Japan

[21] Appl. No.: 275,747

[22] Filed: Jul. 20, 1994

[30] Foreign Application Priority Data

Jul. 29, 1993 [JP] Japan .................................. 5-207312

[51] Int. Cl.$^6$ ...................................................... H02P 8/00
[52] U.S. Cl. ........................... 318/696; 318/685; 318/65; 318/280; 318/286
[58] Field of Search ...................................... 318/696, 685, 318/65, 280, 286; 363/58, 132, 136, 127; 354/195.1; 359/696

[56] References Cited

U.S. PATENT DOCUMENTS

| | | | |
|---|---|---|---|
| 3,861,786 | 1/1975 | Badgett | 318/280 |
| 3,969,941 | 7/1976 | Rapp | 318/685 |
| 3,976,923 | 8/1976 | Flirtion et al. | 318/280 |
| 4,091,316 | 5/1978 | Friedman | 318/696 |
| 4,234,838 | 11/1980 | Langley et al. | 318/696 |
| 4,353,021 | 10/1982 | Watanabe et al. | 318/696 |
| 4,368,414 | 1/1983 | Watanabe et al. | 318/696 |
| 4,415,845 | 11/1983 | Oudet | 318/696 |
| 4,510,266 | 4/1985 | Eertink | 318/696 |
| 4,631,432 | 12/1986 | Thaler | 318/280 |
| 4,845,417 | 7/1989 | Oakubo et al. | 318/696 |
| 4,963,808 | 10/1990 | Torisawa et al. | 318/685 |
| 5,008,607 | 4/1991 | Ono et al. | 318/696 |
| 5,059,883 | 10/1991 | Takahashi | 318/696 |
| 5,164,650 | 11/1992 | Kikugawa | 318/696 |
| 5,194,796 | 3/1993 | Domeki et al. | 318/696 |
| 5,225,756 | 7/1993 | Coutu | 318/696 |
| 5,260,634 | 11/1993 | Tsuyuguchi et al. | 318/696 |
| 5,391,866 | 2/1995 | Hoshino et al. | 359/696 X |

*Primary Examiner*—Karen Masih
*Attorney, Agent, or Firm*—Fitzpatrick, Cella, Harper & Scinto

[57] ABSTRACT

A stepping motor drive circuit including a bridge circuit composed of energizing coils constituting a stepping motor and four transistors, and current value switching circuitry for selecting a value of current flow according to the rotation direction of the stepping motor. A value of constant current flow is determined according to the rotation direction of the stepping motor, so that the torque of the stepping motor is optimized relative to a load.

6 Claims, 5 Drawing Sheets

1

STEPPING MOTOR DRIVE UNIT

BACKGROUND OF THE INVENTION

1. Field of the Invention

The present invention relates to a stepping motor drive unit for optimizing a torque relative to a load.

2. Description of the Related Art

A conventional drive circuit for a two-phase stepping motor is shown in FIG. 1. A stepping motor comprises energizing coils 1 and 2 each responsible for one phase, transistors 3 to 10, feedback resistors 11 and 12, amplifiers 13 to 16, a power supply 17, a reverse-flow prevention diode 18, a pulse control circuit 19 for controlling forward and reverse rotations of a motor, a CPU 20, a backup capacitor 21, and a reference voltage source 22.

The operation of the stepping motor drive circuit having the foregoing circuit elements will be described briefly. The CPU 20 informs the pulse control circuit 19 of the number of drive steps. The pulse control circuit 19 turns on or off the transistors 3 to 10 so that certain pulsating current flow into the coil 1 or 2 in a given direction. That is to say, a constant current drive circuit composed of the transistors 3 and 8, feedback resistor 11, amplifier 15, and reference voltage source 22 provides a pulsating current flow through energizing coil 1 in one direction. A constant current drive circuit composed of transistors 4 and 7, feedback resistor 11, amplifier 16, and reference voltage source 22 provides a pulsating current flow in the opposite direction through energizing coil 1. The same applies to energizing coil 2. A constant current drive circuit composed of transistors 5 and 10, feedback resistor 12, amplifier 13, and reference voltage source 22 provides a pulsating current flow through energizing coil 2 in one direction. A constant current drive circuit composed of transistors 6 and 9, feedback resistor 12, amplifier 14, and reference voltage 22 provides a pulsating current flow in the opposite direction through energizing coil 2. The constant current value is determined in accordance with the voltage value at the reference voltage source 22.

FIG. 2 is a side view showing a structure in which a stepping motor STPM is used as an actuator for driving a lens array in a camera. The actuator comprises a lens array receptacle 23, a ground plate 24, a lead screw 25, an offset spring 26, yokes 27 and 28 each having a coil responsible for one phase, and a rotor 29.

A stepping motor STPM composed of yokes 27 and 28 and rotor 29 is fixed to a ground plate 24. The lens array receptacle 23 is threaded so that the distance thereof from the ground plate 24 can be varied with rotation of the lead screw 25. The rotor 29 and lead screw 25 are mutually coaxial and fixed. The lens array receptacle 23 therefore moves along the lead screw with rotation of the stepping motor STPM. Assuming that the lens array receptacle 23 moves from an initial position 63 in a non-pressing direction 30 of offset spring 26, that is, in a direction in which the offset spring 26 does not press the lens array receptacle (the stepping motor rotates counterclockwise) or in a pressing direction 31 thereof, that is, a direction in which the offset spring 26 presses the lens array receptacle (the stepping motor rotates clockwise), a quantity of movement, a load torque applied to the shaft of the stepping motor STPM, and a torque of the stepping motor STPM have the relationships shown in the graph of FIG. 3. In FIG. 3, the abscissa indicates a quantity of movement 32, and the ordinate indicates a torque 33. It is seen from FIG. 3 that even when the load torque 34 applied to the motor shaft becomes maximum, the torque 35 of the stepping motor STPM remains unaffected.

As long as the number of revolutions and input current of the stepping motor STPM are constant, the torque of the stepping motor STPM remains constant. The load torque 34 applied to the motor shaft varies linearly according to a pressing force provided by the offset spring 26. In other words, the load torque 34 increases when the stepping motor rotates clockwise, and decreases when the stepping motor rotates counterclockwise.

However, when the load torque applied to the motor shaft varies, the response curve plotting a trajectory along which the stepping motor STPM makes the first step becomes as shown in FIG. 4. When a first step start signal 37 is generated, if the load torque applied to the motor shaft is large, then the response curve is plotted as indicated with 39. If the load torque applied to the motor shaft is small, then the response curve is plotted as indicated with 38 to show a large overshoot. The next step start signal must therefore be generated according to the timing at which the response curve stabilizes. This poses a problem in high-speed operation of the stepping motor STPM. Supposing a second step start signal would be generated according to the timing indicated with the response curve 38 in FIG. 4, the stepping motor STPM rotates in relative movements and becomes unstable. At worst, a loss of synchronism occurs.

SUMMARY OF THE INVENTION

The present invention attempts to solve the aforesaid problems. An object of the present invention is to provide a stepping motor drive unit for optimizing a drive torque relative to a load.

Another object of the present invention is to provide a stepping motor drive unit for varying an input current of a stepping motor according to the rotation direction of the stepping motor and thus permitting stable operation.

In one aspect, the present invention relates to a stepping motor drive unit comprising a stepping motor including at least two energizing coils, a bridge circuit for providing current flow through the energizing coils in forward and reverse flow directions, the bridge circuit having a plurality of transistors for switching between the forward and reverse flow directions, control means for switching the plurality of transistors according to a rotation direction of the stepping motor, so that current flows through the energizing coils in either the forward or reverse flow direction, and switching means for selecting a value of current flowing through the energizing coils according to the rotation direction of the stepping motor.

Other objects and features of the present invention will be apparent from an exemplary embodiment described below.

DESCRIPTION OF THE PREFERRED EMBODIMENT

Figure 5:
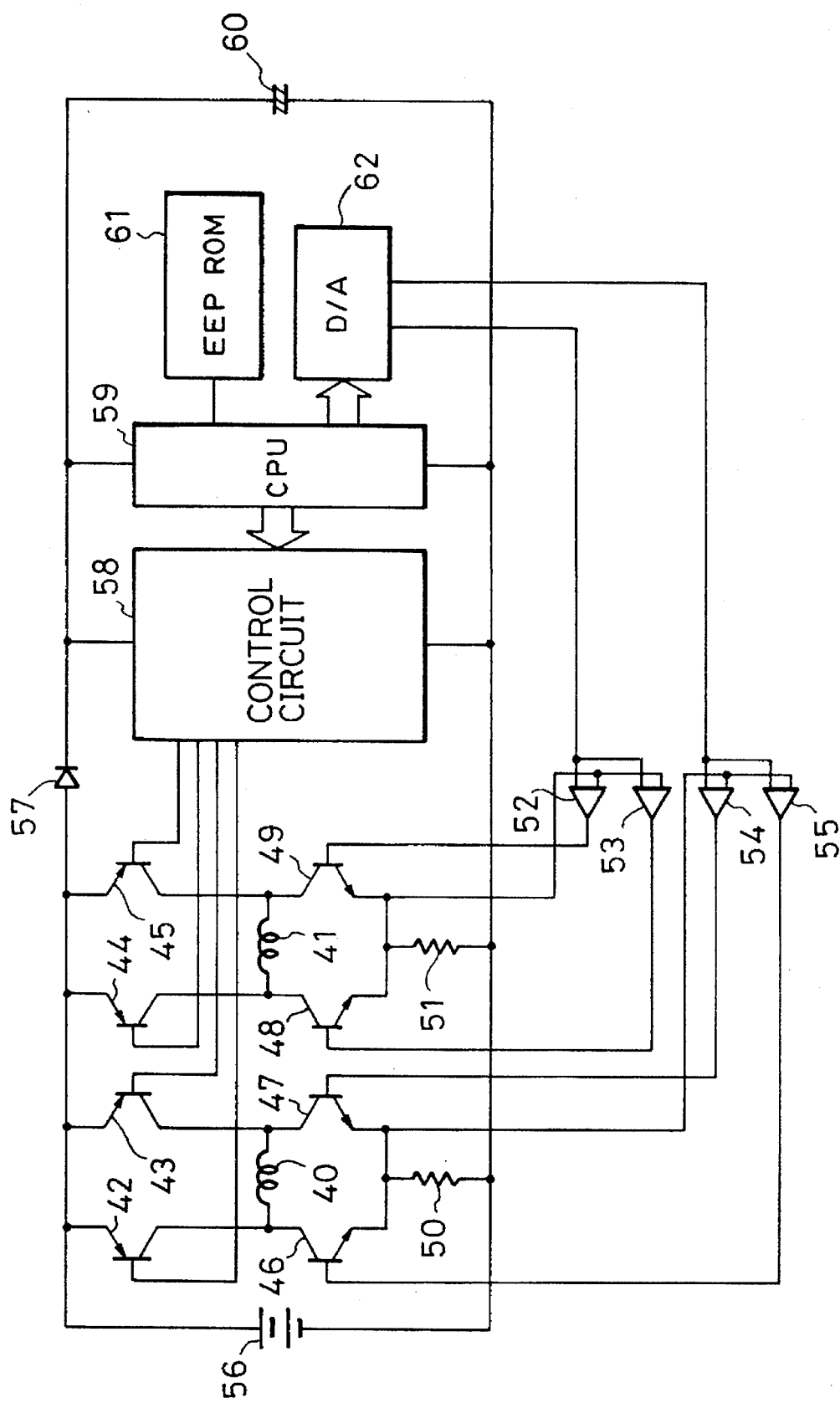
FIG. 5 is a circuit diagram of a stepping motor drive unit according to an embodiment of the present invention.

An embodiment of the present invention will be described with reference to FIG. 5. FIG. 5 is a circuit diagram of a stepping motor drive unit according to the present invention. The stepping motor drive circuit according to the present invention comprises energizing coils 40 and 41 each responsible for one phase of a stepping motor, transistors 42 to 49, feedback resistors 50 and 51, amplifiers 52 to 55, a power supply 56, a reverse-flow prevention diode 57, a pulse control circuit 58 for controlling the forward and reverse rotations of the stepping motor, a CPU 59, a backup capacitor 60, a memory such as an EEPROM, and a D/A converter 62.

Next, the operation of the stepping motor drive circuit will be described. The CPU 59 informs the pulse control circuit 58 of the number of drive steps. The pulse control circuit 58 turns on or off the transistors 42 to 49 so that certain pulsating current flows through energizing coil 40 or 41 in a given direction. A constant current circuit composed of transistors 42 and 47, feedback resistor 50, amplifier 54, and D/A converter 62 for specifying a reference voltage value provides a pulsating current flow through energizing coil 40 in one direction. A constant current circuit composed of transistors 43 and 46, feedback resistor 50, amplifier 55, and D/A converter 62 for specifying a reference voltage value provides a pulsating current flow in the opposite direction through energizing coil 40.

The same applies to energizing coil 41. A constant current circuit composed of transistors 44 and 49, feedback resistor 51, amplifier 52, and D/A converter 62 for specifying a reference voltage value provides a pulsating current flow through energizing coil 2 in one direction. A constant current circuit composed of transistors 45 and 48, feedback resistor 51, amplifier 53, and D/A converter 62 for specifying a reference voltage value provides a pulsating current flow in the opposite direction through energizing coil 41.

The value of constant current flowing through the coil 40 or 41 is determined as described below. Appropriate current value data associated with clockwise and counterclockwise rotations are pre-set in memory such as an EEPROM 61. The CPU 59 reads pre-set current value data from the memory, and feeds the pre-set current value data, associated with the clockwise or counterclockwise direction, to the D/A converter 62. The D/A converter 62 converts the current value data (digital value) into an analog value, and feeds the analog value as a reference voltage value to amplifiers 53 to 55. Based on the reference voltage value, the constant current value is determined.

Figure 1:
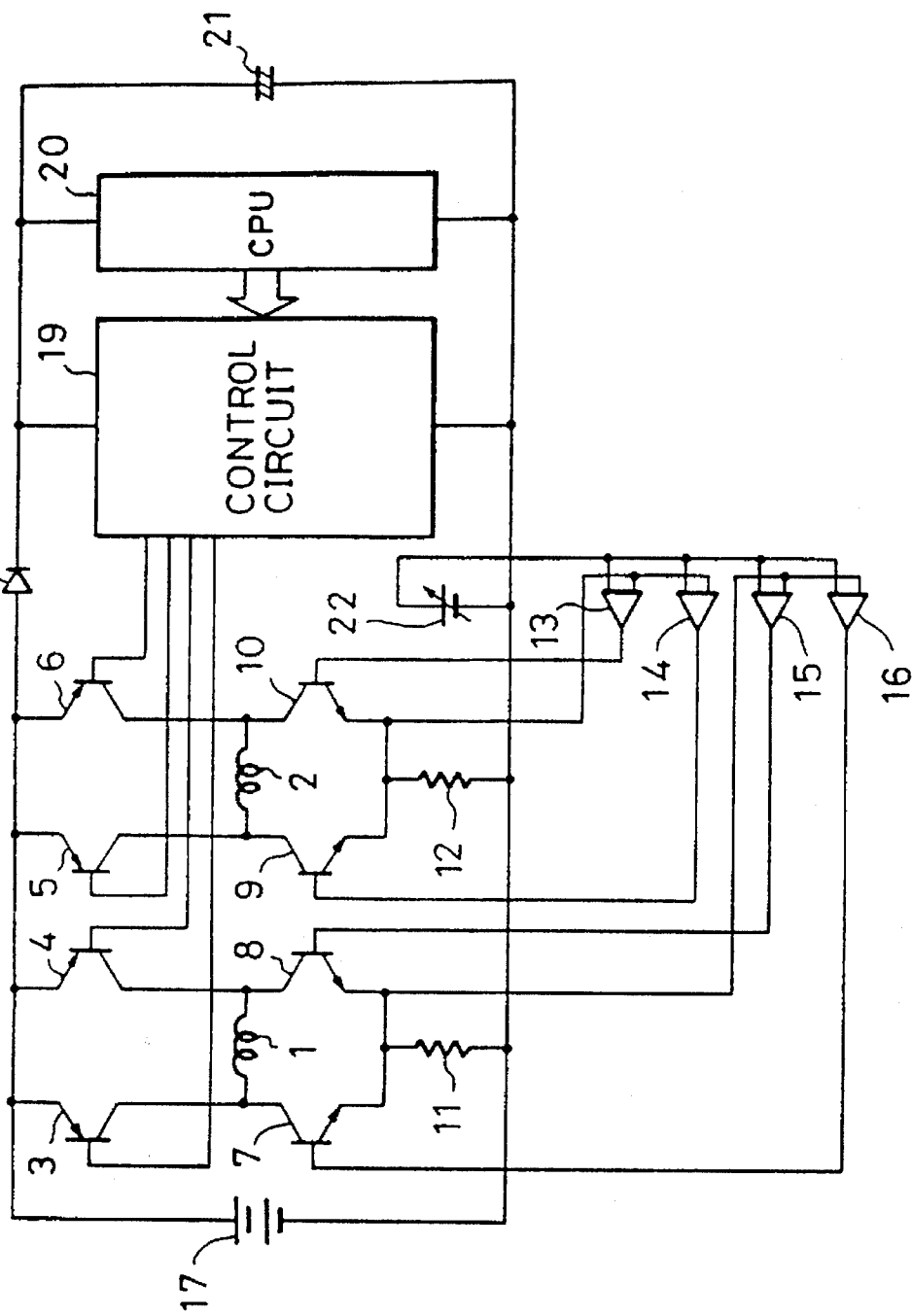
FIG. 1 is a circuit diagram showing a conventional stepping motor drive unit.
Figure 2:
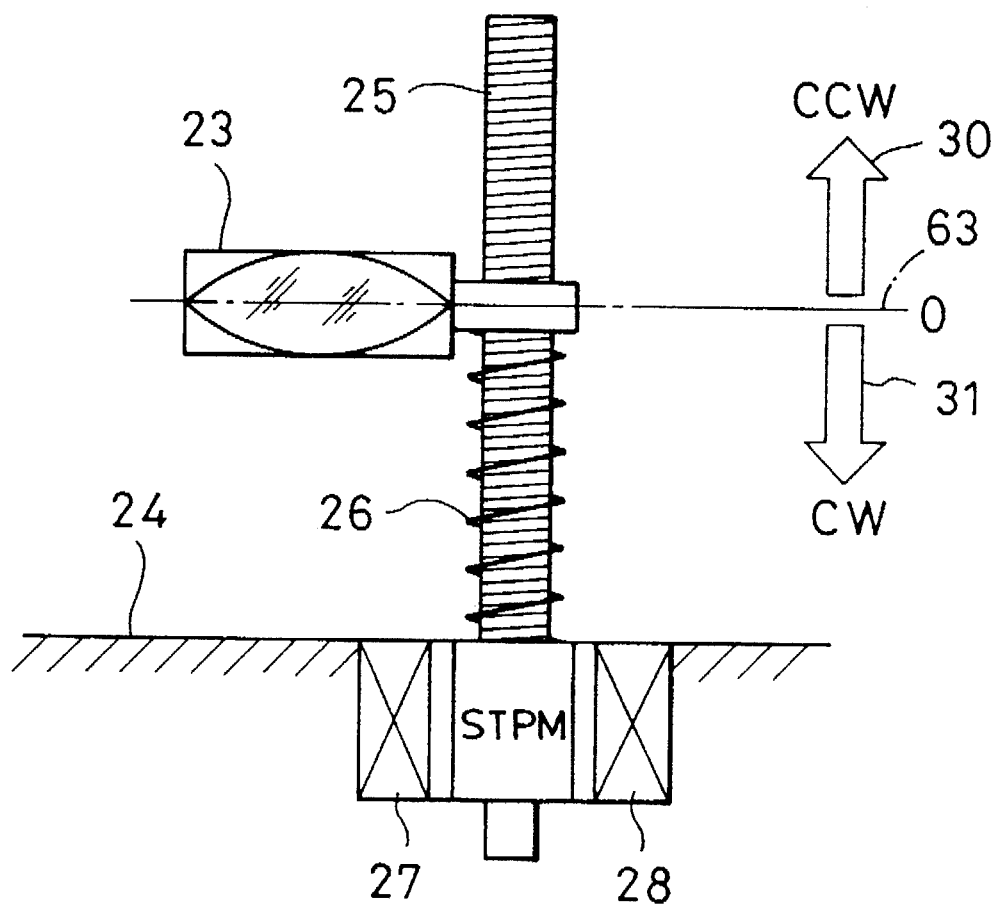
FIG. 2 is a sectional view showing a mechanism of a stepping motor in a camera.
Figure 3:
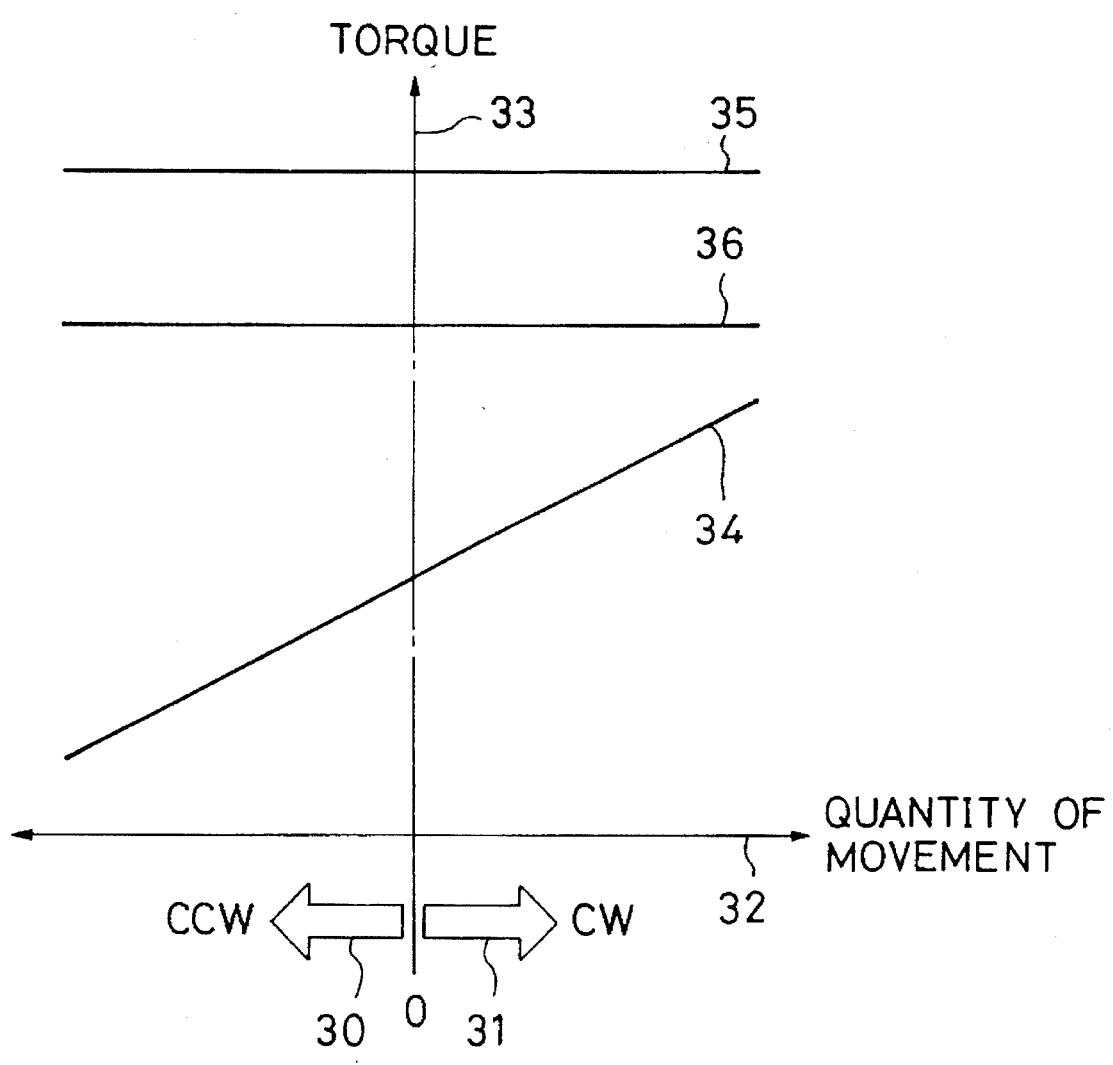
FIG. 3 is a graph plotting torques of a stepping motor.
Figure 4:
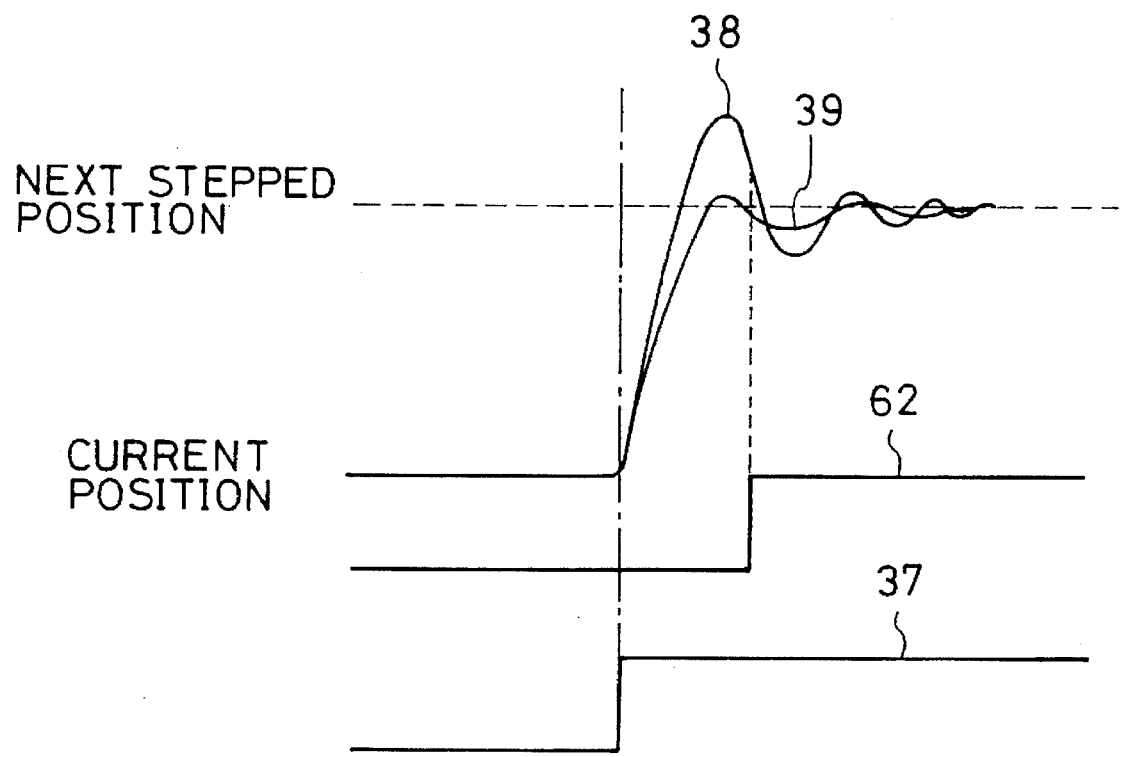
FIG. 4 is a graph plotting response curves of a stepping motor.

Referring again to FIG. 3, indicating torques of a stepping motor STPM during clockwise and counterclockwise rotations, the torque during a clockwise rotation started at an initial position 62 of a lens array receptacle is indicated as reference numeral 35, and the torque for a counterclockwise rotation is indicated as reference numeral 36. The torque of the stepping motor STPM is controlled so as not to get larger in line with the load torque 34 applied to the motor shaft. The response curve is as indicated with reference numeral 39 in FIG. 4, wherein an overshoot is limited.

As described so far, current value data associated with clockwise and counterclockwise rotations are pre-set and selectively specified in a stepping motor drive circuit. Even when the load torque applied to the motor shaft varies depending on a clockwise or counterclockwise rotation, the stepping motor can be driven at a high speed.

While the present invention has been described with respect to what presently are considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A stepping motor drive unit for a stepping motor including a driven member rotatable in a first direction or a second direction opposite the first direction, and having a first load torque when driven in the first direction and a second load torque when driven in the second direction, the drive unit comprising:

at least two energizing coils;

at least two bridge circuits for providing respective current flow through said energizing coils in forward and reverse flow directions, each of said bridge circuits including a plurality of transistors for switching the current flow between the forward and reverse flow directions;

control means for selectively switching said plurality of transistors in accordance with a direction of rotation of the driven member, so that current flows through said energizing coils in either the forward or reverse flow direction; and current setting means for setting a value of current flow through said energizing coils in accordance with current setting means for setting a value of current flow through said energizing coils in accordance with the direction of rotation of the stepping motor, wherein said current setting means includes a memory in which first and second current value data corresponding to the first and second load torques of a stepping motor are stored, and reference voltage setting means for feeding current value data read from said memory as a reference voltage value to said bridge circuits so that a predetermined current corresponding to a selected one of said first and second current value data will flow through said energizing coils.

2. A stepping motor drive unit for a stepping motor including a driven member rotatable in a first direction or a second direction opposite the first direction, and having a first load torque when driven in the first direction and a second load torque when driven in the second direction, the drive unit comprising:

at least two energizing coils;

at least two bridge circuits for providing respective current flow through said energizing coils in forward and reverse flow directions, each of said bridge circuits including a plurality of transistors for switching the current flow between the forward and reverse flow directions;

control means for selectively switching said plurality of transistors in accordance with a direction of rotation of the driven member, so that current flows through said energizng coils in either the forward or reverse flow direction; and current setting means for setting a value of current flow through said energizing coils in accordance with the direction of rotation of the stepping motor, wherein said reference voltage setting means includes a CPU for reading current value data from said memory, and for selecting predetermined current value data according to the direction of rotation of the driven member of a stepping motor, and a D/A converter for converting current value data that is a digital value selected by said CPU into an analog value and feeding the analog value to said bridge circuits.

3. A stepping motor drive unit for driving a stepping motor for a lens array the stepping motor including, a driving mechanism for moving said lens array in a first direction or a second direction opposite the first direction, said driving mechanism having pressing means for pressing said lens array in said first or second direction, and having a first load torque when said pressing means presses said lens array in said first direction and having a second load torque when said pressing means presses said lens array in the second direction, said stepping motor including a driven member rotatable in forward and reverse directions, such that, when said driven member rotates in the forward direction, said lens array moves in the first direction, and when said driven motor rotates in the reverse direction, said lens array moves in the second direction, said drive unit comprising:

energizing coils;

a circuit for providing current flow through said energizing coils in forward and reverse directions, said circuit providing current flow in the forward direction so as to rotate said driven member in the forward direction, and providing current flow in the reverse direction so as to rotate said driven member in the reverse direction;

control means for controlling said circuit in accordance with current data so as to selectively provide current flow through said energizing coils in the forward or reverse direction; and current setting means for setting a value of current flow through said energizing coils in accordance with the direction of rotation of said driven member.

4. A stepping motor drive unit, comprising:

a driving mechanism for providing a drive in a first direction or a second direction opposite the first direction, said driving mechanism including pressing means having a first load torque when said pressing means presses in said first direction and a second load torque when said pressing means presses in said second direction;

a stepping motor serving as a driving source for driving said driving mechanism, said stepping motor including energizing coils and a rotor rotatable in forward and reverse directions, said rotor rotating in the forward direction so as to drive said drive mechanism in said first direction, and rotating in the reverse direction so as to drive said driving mechanism in said second direction;

a circuit for providing current flow through said energizing coils in forward and reverse directions, said circuit providing current flow in the forward direction so as to rotate said rotor in the forward direction, and providing current flow in the reverse direction so as to rotate said rotor in the reverse direction;

control means for controlling said circuit so as to selectively provide current flow through said energizing coils in the forward or reverse direction; and current setting means for setting a value of current flow through said energizing coils in accordance with the direction of rotation of said rotor.

5. A stepping motor drive unit according to claim 4, wherein said current setting means includes a memory in which current value data corresponding to the forward and reverse directions of rotation of said driven member are stored, and a reference voltage setting means for feeding current value data read from said memory as a reference voltage value to said circuit so that a predetermined current corresponding to said current value data flows through said energizing coils.

6. A stepping motor drive unit according to claim 5, wherein said reference voltage setting means includes a CPU for reading current value data from said memory, and for selecting predetermined current value data according to the direction of rotation of the driven member of a stepping motor, and a D/A converter for converting current value data that is a digital value selected by said CPU into an analog value and feeding the analog value to said bridge circuit.

\* \* \* \* \*

UNITED STATES PATENT AND TRADEMARK OFFICE
CERTIFICATE OF CORRECTION

PATENT NO. : 5,625,268
DATED : April 29, 1997
INVENTOR(S) : HIROSHI MIYANARI

It is certified that error appears in the above-indentified patent and that said Letters Patent is hereby corrected as shown below:

COLUMN 2

Line 19, "10" should be deleted.

COLUMN 4

Lines 28 and 29 should be deleted.

Signed and Sealed this

Twenty-first Day of October 1997

Attest:

BRUCE LEHMAN

Attesting Officer

Commissioner of Patents and Trademarks